UNITED STATES PATENT OFFICE.

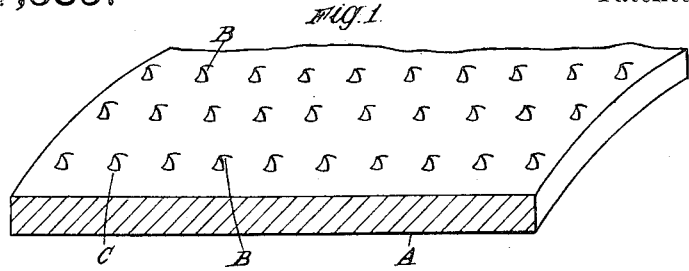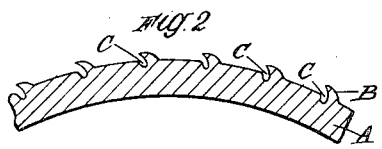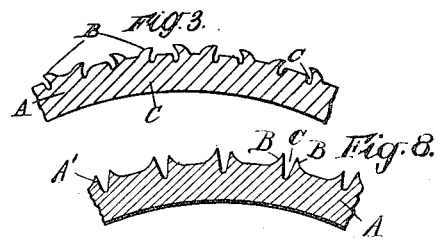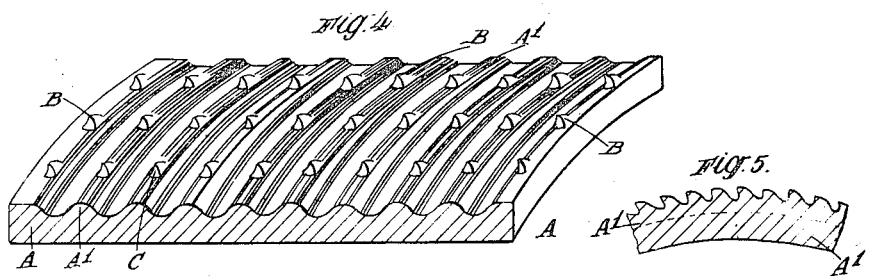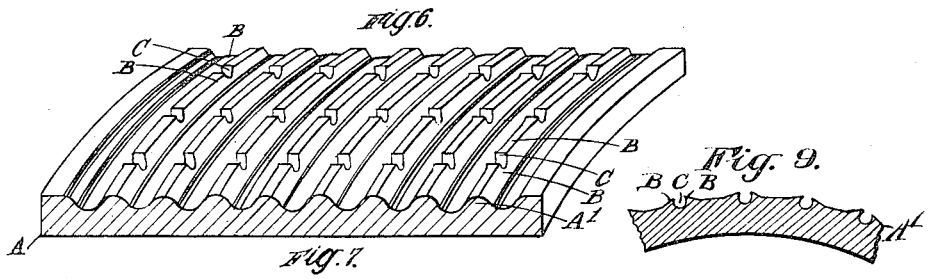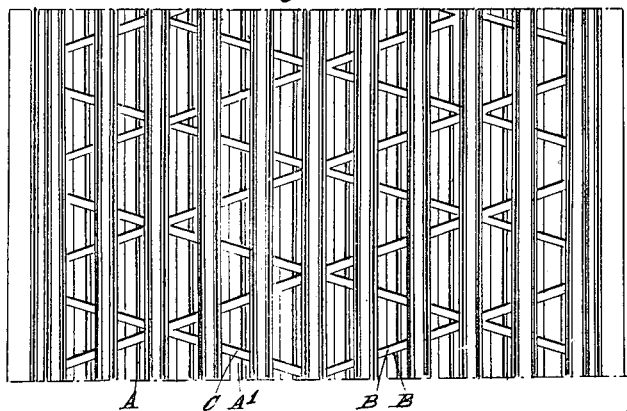

COLIN MACBETH AND HARRY CLARANCE YOUNG, OF BIRMINGHAM, ENGLAND, ASSIGNORS TO THE DUNLOP RUBBER COMPANY, LIMITED, OF WESTMINSTER, LONDON, ENGLAND.

SOLID RUBBER TIRE.

1,317,585.         Specification of Letters Patent.     Patented Sept. 30, 1919.

Application filed April 1, 1919. Serial No. 286,794.

*To all whom it may concern:*

Be it known that we, COLIN MACBETH and HARRY CLARANCE YOUNG, both subjects of the King of Great Britain, residing at Para Mills, Aston Cross, Birmingham, in the county of Warwick, England, have invented certain new and useful Improvements in or Relating to Solid Rubber Tires, of which the following is a specification.

This invention relates to solid rubber tires and has particular reference to the usual construction of metal foundation bands now generally employed on to which the rubber portions of the tire are vulcanized and which are usually pressed by hydraulic means on to the wheels. Such metal bands are often provided with circumferential grooves turned or rolled in the outer surface for the purpose of preventing separation of the vulcanite at the lower part of the rubber portion of the tire from the metal band. In some instances the grooves are undercut or of dovetail formation and it is found in practice that such undercut or dovetail grooves insure satisfactory adhesion of the vulcanite to the band without having to resort to machining of the metal surface. This construction however is objectionable as it involves cutting away metal which usually becomes scrap. In cases where the circumferential grooves are merely rolled in and are not undercut it is found that the adhesion between the metal band and the vulcanite is not satisfactory as the vulcanite breaks away from the band under severe stresses.

The chief object of the present invention is to obtain firm adhesion of vulcanite to the band with a rolled surface so as to avoid cutting away of the metal which would result in loss or scrap.

According to this invention the rolled outer surface of the band (which may be grooved or plain) is treated in such manner that portions of the metal on that surface are displaced to form a large number of small outstanding projections, notches or the like which enable a secure hold on to the vulcanite to be obtained without necessitating machining of the said outer surface; for instance, a band having a flat or plain outer surface may be formed with a considerable number of raised or jagged portions punched up from the outer surface of the band and so shaped that in profile they somewhat resemble the teeth of a file, saw, rasp or ratchet wheel. Similar raised or jagged portions may be provided on a grooved outer surface of the band and it may be preferred in connection with such a band to form on the ridges between the grooves, notches or depressions of such a character that the metal adjacent to the notches or depressions constitutes the equivalent of the aforesaid raised or jagged portions.

In order that the said invention may be clearly understood and readily carried into effect, the same will be described more fully with reference to the accompanying diagrammatic drawings in which:—

Figure 1 shows a portion of a metal foundation band having a flat outer surface which is provided with a series of raised or jagged portions.

Fig. 2 is a sectional view showing the approximate shape or profile of the raised or jagged portions.

Fig. 3 is a similar view to Fig. 2 illustrating a modification.

Fig. 4 illustrates a portion of the foundation band having a grooved outer surface provided with raised or jagged portions similar to those indicated in Fig. 1.

Fig. 5 is a sectional view of the modification illustrated in Fig. 4.

Fig. 6 illustrates a portion of a foundation band having a grooved outer surface provided with a series of notches as aforesaid.

Fig. 7 is a fragmentary plan view of a band such as illustrated in Fig. 6 showing a modified arrangement of the notches around the outer surface of the band. Figs. 8 and 9 are sectional views hereinafter explained.

Throughout the various figures, A represents the foundation band, the upper surface of which as shown in the several examples is treated to produce the aforesaid raised or jagged portions, projections or the equivalent B. In the example shown in Fig. 1 the outer plain surface of the band is provided with a number of raised or jagged portions B which may be produced by punching up the outer surface of the metal with a suitable tool so that the portion of the metal raised from the surface leaves a notch such as C, see Fig. 2. The raised or jagged portions B are of such shape that in profile or section they somewhat resemble the teeth of a file, saw, rasp or ratchet wheel, see Fig. 2. The raised or jagged portions B may be arranged in any desired order or formation around the band, for example, they may be disposed in annular rows and in transverse rows as shown in Fig. 1, the said jagged portions B thus being in alinement both circumferentially and transversely. The raised or jagged portions may however be staggered or irregularly arranged if desired. Instead of the jagged portions being arranged with their extremities pointing in the same direction as shown in Figs. 1 and 2 they may be so arranged that their extremities point in opposite directions as shown for example in Fig. 3 in which alternate portions may point in one direction and the intervening portions in the opposite direction. Fig. 4 shows the invention applied to a band having its outer surface rolled with circumferential grooves and the raised or jagged portions such as B may be formed or provided on the metal ridges A' disposed on each side of the grooves. Generally the outer surface of the band may be regarded as resembling on an enlarged scale the roughened surface of a rasp or file and the aforesaid jagged portions B may be produced in a similar manner to that in which the jagged portions or teeth of a file or rasp are produced. It will be observed from Figs. 2, 3 and 5 that the formation of the jagged portions is such that they are to some extent undercut or recessed so that a satisfactory grip on the vulcanite of the tire is obtained thus preventing separation of the vulcanite from the band or an expansion or spreading of local damage due to stones, etc., with which the tire is likely to come in contact. The arrangements illustrated in Figs. 6 to 9 have special reference to foundation bands provided with circumferential grooves and as shown in Fig. 6 the ridges A' between the said grooves are provided with notches or depressions of such a character that the metal adjacent to the notches or depressions constitutes horns or humps which are the equivalent of the aforesaid raised or jagged portions B. It is preferred to flatten the humps or horns B so that each notch C assumes a somewhat undercut formation, see Fig. 9, which improves the adhesion between the band and the vulcanite strip of the tire. Any desired regular or irregular arrangement of the notches may however be provided.

What we claim and desire to secure by Letters Patent of the United States is:—

1. A metal foundation band for solid rubber tires, having its outer surface provided with a large number of small, hook-like, undercut projections shaped to overhang adjacent parts of the metal.

2. A metal foundation band for solid rubber tires, the outer surface of which band is formed with a series of depressions and has a portion of the metal adjacent each depression shaped to provide a tooth-like projection with its point directed toward the depression, substantially as and for the purpose specified.

COLIN MACBETH.
HARRY CLARANCE YOUNG.